(12) United States Patent
Festag et al.

(10) Patent No.: US 10,766,388 B2
(45) Date of Patent: Sep. 8, 2020

(54) SEAT STRUCTURE MADE OF BIO FIBER COMPOSITE MATERIAL

(71) Applicant: Lear Corporation, Southfield, MI (US)

(72) Inventors: Peter Festag, Erding (DE); Klaus Raab, Julbach (DE)

(73) Assignee: LEAR CORPORATION, Southfield, MI (US)

( * ) Notice: Subject to any disclaimer, the term of this patent is extended or adjusted under 35 U.S.C. 154(b) by 115 days.

(21) Appl. No.: 15/970,245

(22) Filed: May 3, 2018

(65) Prior Publication Data
US 2018/0319300 A1 Nov. 8, 2018

Related U.S. Application Data

(60) Provisional application No. 62/501,243, filed on May 4, 2017.

(30) Foreign Application Priority Data

Mar. 12, 2018 (DE) .................. 10 2018 203 703

(51) Int. Cl.
B32B 3/10 (2006.01)
B60N 2/68 (2006.01)
B29C 70/22 (2006.01)
B29C 70/54 (2006.01)
B27N 3/04 (2006.01)
B27N 5/00 (2006.01)
B29C 67/24 (2006.01)
B29C 70/34 (2006.01)
B29K 311/10 (2006.01)
B29C 70/48 (2006.01)

(52) U.S. Cl.
CPC ................. B60N 2/68 (2013.01); B27N 3/04 (2013.01); B27N 5/00 (2013.01); B29C 67/248 (2013.01); B29C 70/222 (2013.01); B29C 70/34 (2013.01); B29C 70/548 (2013.01); B60N 2/686 (2013.01); B29C 70/48 (2013.01); B29K 2311/10 (2013.01)

(58) Field of Classification Search
None
See application file for complete search history.

(56) References Cited

U.S. PATENT DOCUMENTS

2008/0145635 A1* 6/2008 Stoll .................. B60N 2/58
428/223

FOREIGN PATENT DOCUMENTS

| CN | 202806475 U | 3/2013 |
| CN | 103648842 A | 3/2014 |
| CN | 105339207 A | 2/2016 |
| CN | 205343942 U | 6/2016 |
| WO | 2013/021485 A1 | 2/2013 |

OTHER PUBLICATIONS

Office Action dated Jun. 2, 2020 for Chinese Appn. No. 2018104084216 filed May 2, 2018, 9 pgs.

* cited by examiner

Primary Examiner — Christopher M Polley
(74) Attorney, Agent, or Firm — Brooks Kushman P.C.

(57) ABSTRACT

A vehicle seat frame includes a back panel and a load carrier component attached to the back panel. The back panel includes a first polymeric matrix and a first plurality of fibers disposed therein. The load carrier component includes a second polymer matrix and a second plurality of fibers disposed therein.

19 Claims, 4 Drawing Sheets

SEAT STRUCTURE MADE OF BIO FIBER COMPOSITE MATERIAL

CROSS-REFERENCE TO RELATED APPLICATIONS

This application claims the benefit of U.S. provisional application Ser. No. 62/501,243 filed May 4, 2017, and priority to DE application 10 2018 203 703.5 filed Mar. 12, 2018, the disclosures of which are hereby incorporated in their entirety by reference herein.

TECHNICAL FIELD

In at least one aspect, the present invention is related to vehicles seats in which structural components are replaced by structural components made from bio fiber composites.

BACKGROUND

Customer requires lighter and smaller design with integration of sustainable materials. Furthermore, the steel welding process is a critical process for degradation of tolerances and material characteristic in near of welding area. Biodegradable resin composites are disclosed in U.S. Patent Appl. Nos 20110229698 and 20020060445.

SUMMARY

The present invention solves one or more problems of the prior art by providing in at least one embodiment, a vehicle seat frame in which components are replaced by a bio fiber composite. The vehicle seat frame includes a back panel and a load carrier component attached to the back panel. The back panel includes a first polymeric matrix and a first plurality of fibers disposed therein. The load carrier component includes a second polymer matrix and a second plurality of fibers disposed therein.

Embodiments of the present invention allow virtually all steel parts (and carbon fiber structures) of a vehicle seat backrest to be replaced by parts made of bio fiber. Moreover, the number of parts can be reduced by intelligent construction of components (shell or tube design) thereby making it is possible to integrate multiple functions into a single component. Advantageously, the bio-composite designs do not use welding processes thereby avoiding high temperature effects. The connection between recliner parts (still made of steel) and bio fiber rear seat can be realized by bonding, over-molding of connection plates and/or by screw fitting. Finally, better designs resulted from topology optimization process and biological shape available, thereby better comfort with thinner foam becomes feasible. Advantageously, the bio composite designs set forth herein result in a weight reduction.

DETAILED DESCRIPTION

Figure 1:
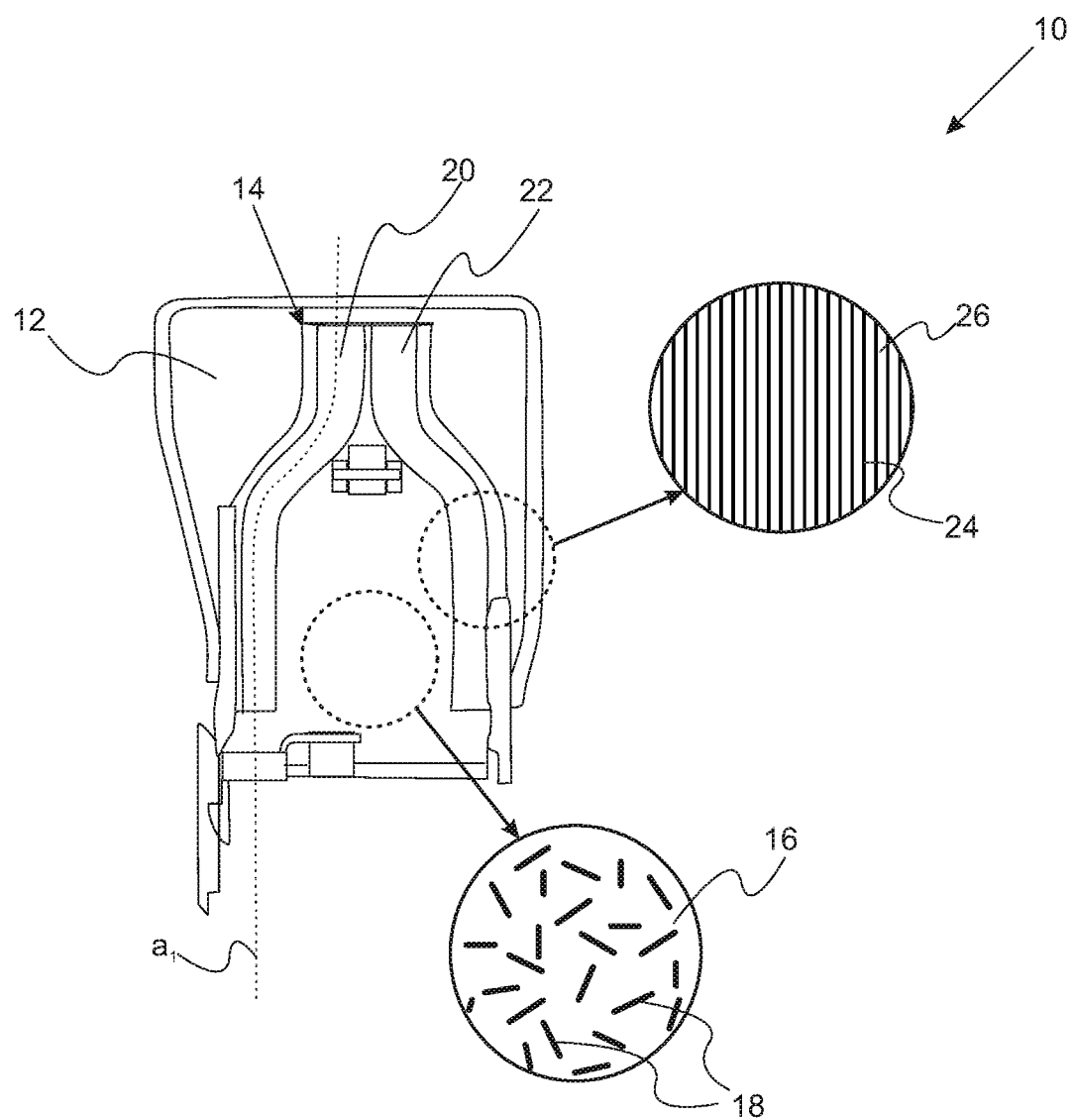
FIG. 1 is a schematic illustration of a profile bio fiber composite vehicle frame design using fiber braided tubes.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Abbreviations:

"PA" is polyamide.

"PET" means polyethylene terephthalate.

"PE" means polyethylene.

"PLA" means polylactic acid.

"PHA" means polyhydroxyalkanoates.

"PHB" means polyhydroxybutyrate.

The term "bio fiber" refers to vegetable, animal, or mineral fibers existing in nature. Typically, these fibers are used in engineering applications.

In general, embodiments of the present invention provide a vehicle seat structural frame formed from a bio fiber composite. The vehicle seat structural frame includes a back panel and a load carrier component attached to the back panel. The back panel includes a first polymeric matrix and a first plurality of fibers disposed therein. The load carrier component includes a second polymer matrix and a second plurality of fibers disposed therein.

With reference to FIG. 1, a schematic illustration of a profile design using fiber braided tubes is provided. Vehicle seat frame component 10 includes back panel 12 and load carrier component 14 bonded thereto. The geometry of back panel 12 is a complex monolithic sheet with or without ribs. Back panel 12 includes a first polymeric matrix 16 and a first plurality of bio fibers 18 disposed therein. In a refinement, plurality of bio fibers 18 include isotropically oriented fibers. Back panel 12 can also incorporate a net for improved impact performance. The geometry of load carrier component 14 is a closed profile. Load carrier component 14 includes a pair of curved or sigmoidal-shaped braided bio fiber tubes 20, 22 ("a double S-curved" load path) embedded in the second polymer matrix 24 with bio fibers 26 in each braided bio fiber tube being optionally angled (e.g., +/−15°) with respect to a longitudinal tube axis $a_1$ ("the S-path"). In a refinement, bio fibers 26 in each bio fiber tube are angled with respect to a longitudinal tube axis $a_1$ at an angle from about +/−5 to +/−80 degrees. In another refinement, bio fibers 26 in each bio fiber tube are angled with respect to a longitudinal tube axis $a_1$ at an angle from about +/−10 to +/−45 degrees. In a variation, back panel 12 is formed from sheet molding compound (e.g. glass fiber reinforced polyester). In another variation, carrier component 14 is formed by an over-braiding preforming process followed by resin transfer molding. In this variation, insert integration might require a foam core. In a refinement, braid sleeves (no inserts) can be used. In some variations, the bio fibers in the back panel are short having a length greater than 0 (e.g. 1) to 50 mm while the bio fibers in load carrier component 14 are long and continuous (e.g., >5 cm). In a variation, the bio fibers in the back panel are short having a length from 1 to 50 mm. In a refinement of this variation, the bio fibers in load carrier component 14 having a length greater than or equal to 5 cm. In another refinement, the bio fibers in load carrier component 14 have an average length from 5 cm to 25 cm or more (e.g., the bio fibers are a continuous filament).

Figure 2:
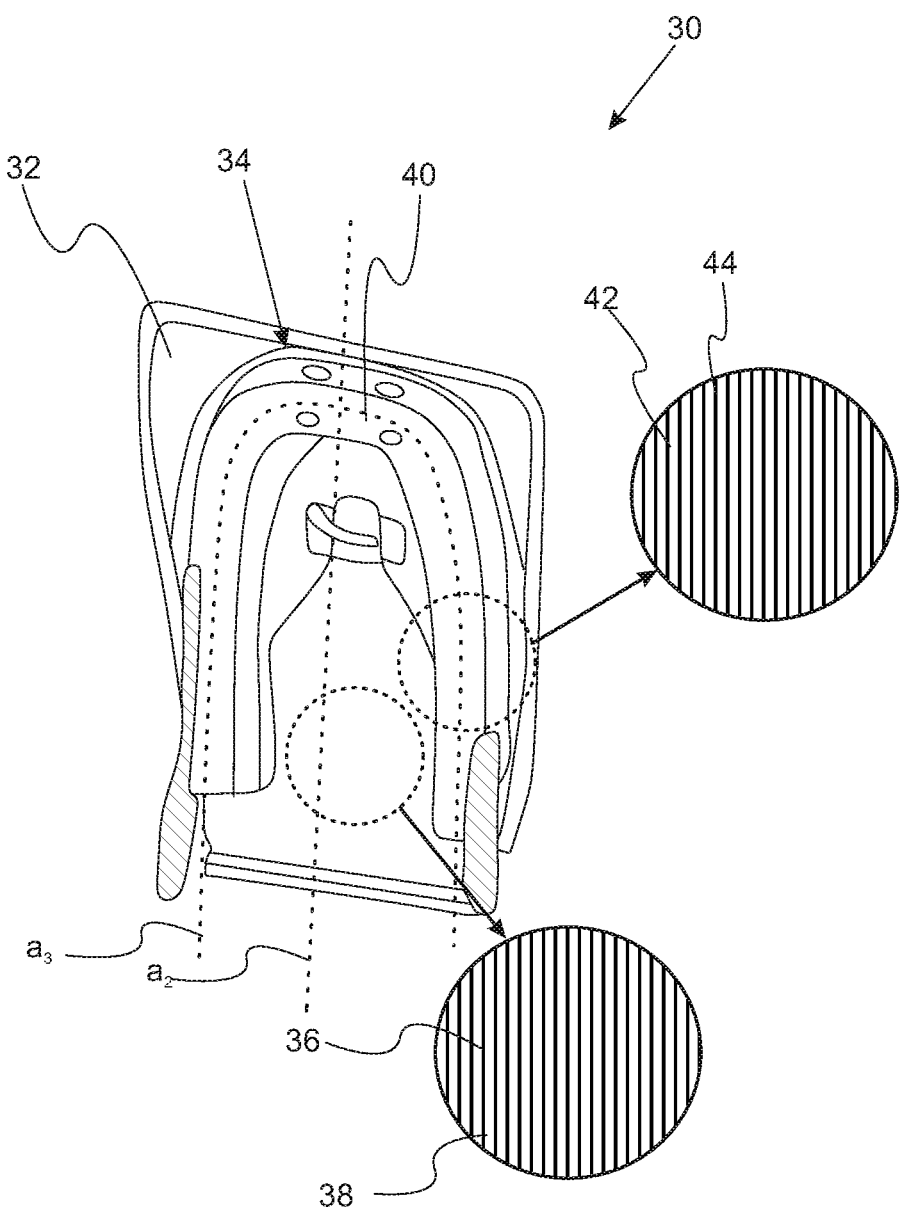
FIG. 2 is a schematic illustration of a tailored fiber stitching (TRP) shell bio fiber composite vehicle frame design.

With reference to FIG. 2, a schematic illustration of a tailored fiber stitching or placement (TRP) shell design is provided. Vehicle seat frame component 30 includes back panel 32 and load carrier component 34 bonded thereto. Back panel 32 is a monolithic shell that includes a first polymeric matrix 36 and a first plurality of bio fibers 38 disposed therein. In a refinement, plurality of bio fibers 38 includes long (e.g., >5 cm) continuous bio fibers that are substantially parallel to each other. In some variations, bio fibers 38 can be oriented at various angles 0 to +/−90° (e.g., 0, +/−45°, +/−90°) with respect to axis $a_2$ to produce a quasi-isotropic arrangement of fibers. In a refinement, bio fibers 38 are oriented at an angle from about +/−5 to +/−80 degrees with respect to axis $a_2$ to produce a quasi-isotropic arrangement of fibers. In another refinement, bio fibers 38 are oriented at an angle from about +/−10 to +/−45 degrees with respect to axis $a_2$ to produce a quasi-isotropic arrangement of fibers.

As depicted in FIG. 2, load carrier component 34 includes an open (e.g., U-shaped) bio fiber shell 40 formed from plurality of bio fibers 42 embedded in the second polymer matrix 44. Bio fibers 42 are long (e.g., >5 cm) continuous bio fibers that are substantially parallel to each other and to a longitudinal axis $a_3$ of the open bio fiber shell 40. In a variation, load carrier component 34 is formed by a tailored fiber stitching (TFP) preforming process followed by resin transfer molding and wherein the back panel is formed from resin transfer molding and/or wet compression molding. In a refinement, a TFP inlay closes the open bio fiber shell and increases mechanical properties.

Figure 3:
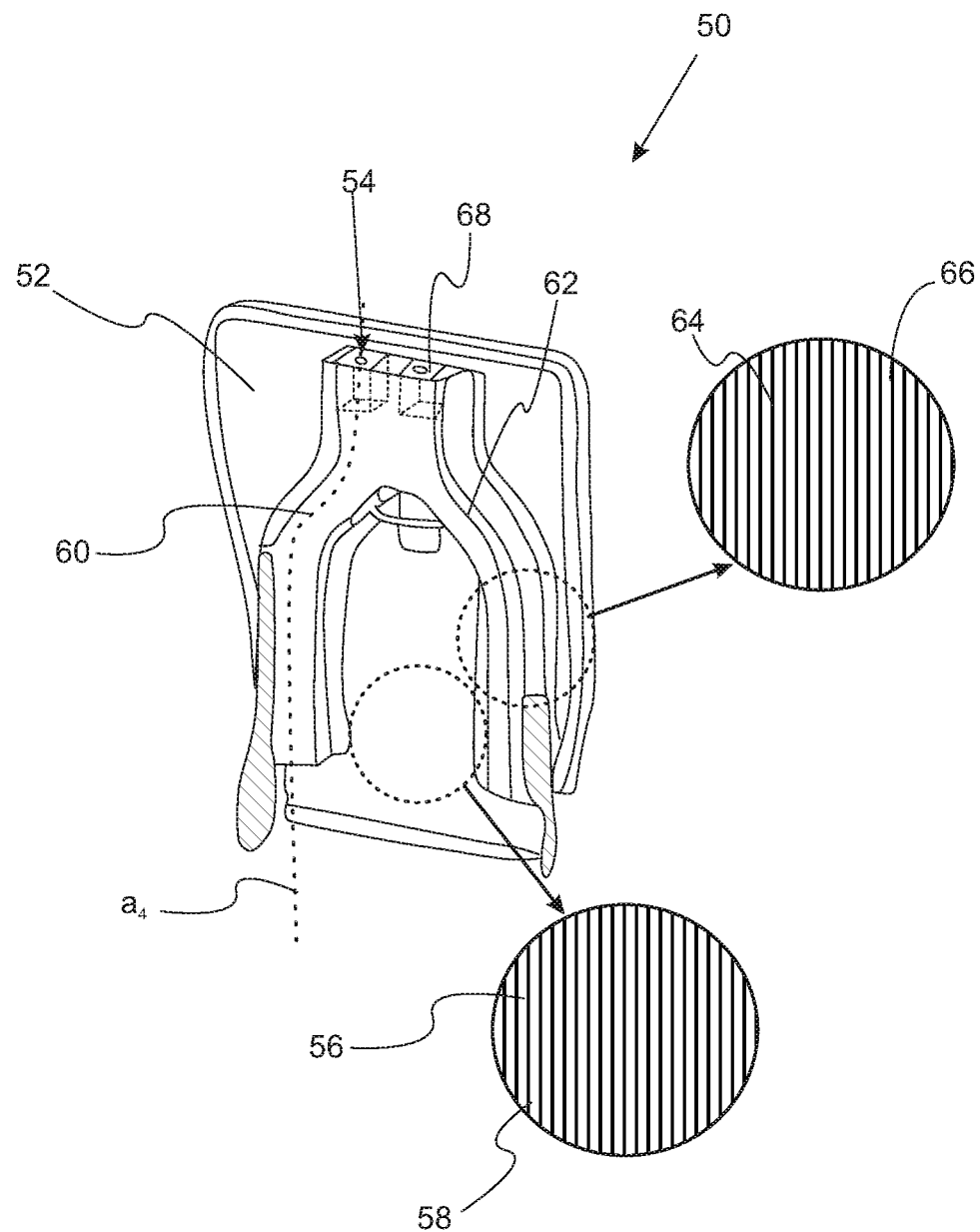
FIG. 3 is a schematic illustration of a sandwich 2-dimensional braid bio fiber composite vehicle frame design with a foam core.

With reference to FIG. 3, a schematic illustration of a sandwich 2-dimensional braid design is provided. Vehicle seat frame component 50 includes back panel 52 which is integral with load carrier component 54 attached thereto. Back panel 52 is a monolithic shell that includes polymeric matrix 56 and a first plurality of bio fibers 58 disposed therein. In a refinement, plurality of bio fibers 58 includes long (e.g., >5 cm) continuous bio fibers that are substantially parallel to each other. In some variations, bio fibers 58 can be oriented at various angles 0 to +/−90° (e.g., 0, +/−45°, +/−90°) with respect to axis $a_2$ to produce a quasi-isotropic arrangement of fibers. In a refinement, bio fibers 58 are oriented at an angle from about +/−5 to +/−80 degrees with respect to axis $a_2$ to produce a quasi-isotropic arrangement of fibers. In another refinement, bio fibers 58 are oriented at an angle from about +/−10 to +/−45 degrees with respect to axis $a_2$ to produce a quasi-isotropic arrangement of fibers.

Still referring to FIG. 3, load carrier component 54 is a monolithic shell that includes a pair of curved or sigmoid shaped 2-dimensional braided bio fiber shells 60, 62 which includes bio fibers 64 embedded in the second polymer matrix 66. Bio fibers 64 in each braided bio fiber tube are optionally angled (e.g., +/−15°) with respect to a longitudinal tube axis $a_4$. In a refinement, load carrier component 54 further includes a foam core 68. In a variation, load carrier component 54 is formed by a 2-D braid ("Litze") preforming process followed by resin transfer molding.

Figure 4:
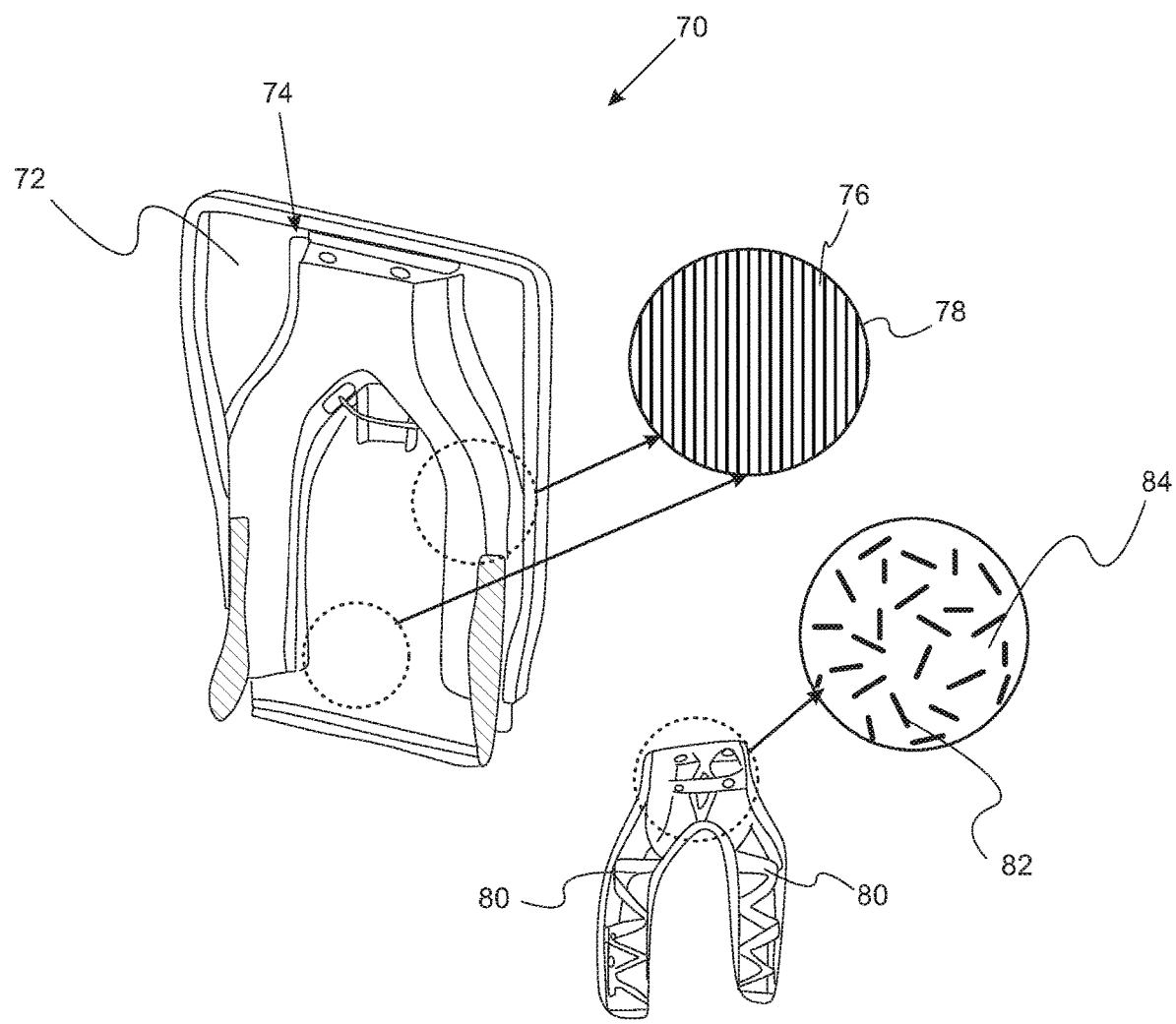
FIG. 4 is a schematic illustration of a thermoplastic bio fiber composite vehicle frame design.

With reference to FIG. 4, a schematic illustration of a thermoplastic design is provided. Vehicle seat frame component 70 includes back panel 72 which is integral with load carrier component 74. Back panel 72 and load carrier component 74 each include polymeric matrix 76 and a first plurality of bio fibers 78 disposed therein. In a refinement, plurality of bio fibers 78 includes long (e.g., >5 cm) continuous bio fibers that are substantially parallel to each other. In some variations, bio fibers 78 are oriented at 0 degrees with respect to axis. In a refinement, and optionally angled with respect to a longitudinal tube axis, the load carrier component including ribs 80 disposed over a surface thereof. In a refinement, the ribs are made of PE/PA with or without fiber. In a variation, load carrier component 74 is formed by a tape-laying preform process followed by compression molding and injection over-molding.

In each of the variations and refinements set forth above, the first plurality of bio fibers of the back panel, the second plurality of bio fibers of the load carrier component, and the bio fibers of the ribs of FIG. 4 can each independently selected from the group consisting of Flax fibers, Hemp fibers, Kenaf fibers, and combinations thereof. Moreover, the first polymer matrix of the back panel, the second polymer matrix of the load carrier component, and the polymeric matrix of the ribs of FIG. 4 are each independently a bioplastic. Examples of such bioplastics include, but are not limited to, (Bio)-PET, (Bio)-PE, PLA, PHA, PHB, and combinations thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat comprising:
a back panel including a first polymeric matrix and a first plurality of bio fibers disposed therein; and
a load carrier component attached to the back panel, the load carrier component including a second polymer matrix and a second plurality of bio fibers disposed therein, wherein the load carrier component includes a pair of curved or sigmoidal-shaped braided bio fiber tubes with bio fibers in each braided bio fiber tube being angled with respect to a longitudinal tube axis of the pair of curved or sigmoidal-shaped braided bio fiber tubes or wherein the load carrier component includes an open bio fiber shell embedded in the second polymer matrix, the open bio fiber shell including continuous biofibers that are substantially parallel to each other and to a longitudinal axis of the open bio fiber shell.

2. The vehicle seat of claim 1 wherein the load carrier component includes the pair of curved or sigmoidal-shaped braided bio fiber tubes embedded in the second polymer-matrix.

3. The vehicle seat of claim 2 wherein the back panel is bonded to the load carrier component and the first plurality of bio fibers include isotropically oriented fibers.

4. The vehicle seat of claim 3 wherein the load carrier component is formed by an over-braiding preforming process followed by resin transfer molding and wherein the back panel is formed from sheet molding compound.

5. The vehicle seat of claim 3 wherein the bio fibers in the back panel have a length greater than 0 to 50 mm.

6. The vehicle seat of claim 1 wherein the load carrier component includes the open bio fiber shell embedded in the second polymer matrix.

7. The vehicle seat of claim 6 wherein the back panel is bonded to the load carrier component and the first plurality of bio fibers include continuous bio fibers that are substantially parallel.

8. The vehicle seat of claim 7 wherein the load carrier component is formed by a tailored fiber stitching (TFP) preforming process followed by resin transfer molding and wherein the back panel is formed from resin transfer molding and/or wet compression molding.

9. The vehicle seat of claim 8 wherein a TFP inlay closes the open bio fiber shell and increases mechanical properties.

10. The vehicle seat of claim 1 wherein the first plurality of bio fibers and the second plurality of bio fibers are each independently selected from the group consisting of Flax fibers, Hemp fibers, Kenaf fibers, and combinations thereof.

11. The vehicle seat of claim 1 wherein the first polymer matrix and the second polymer matrix are each independently a bioplastic.

12. The vehicle seat of claim 1 wherein the first polymer matrix and the second polymer matrix are each independently selected from the group consisting of (Bio)-PET, (Bio)-PE, PLA, PHA, PHB, and combinations thereof.

13. A vehicle seat comprising:
a back panel including a first polymeric matrix and a first plurality of bio fibers disposed therein; and
a load carrier component attached to the back panel, the load carrier component including a second polymer matrix and a second plurality of bio fibers disposed therein, wherein the load carrier component is integral with the back panel, the load carrier component including a pair of curved or sigmoid shaped 2-dimensional braided bio fiber shells embedded in the second polymer matrix with bio fibers in each bio fiber shell being continuous and substantially parallel to each other and optionally angled with respect to a longitudinal shell axis.

14. The vehicle seat of claim 13 wherein the first plurality of bio fibers includes continuous fibers that are quasi-isotropic to each other.

15. The vehicle seat of claim 14 wherein the load carrier component further includes a foam core.

16. The vehicle seat of claim 14 wherein the load carrier component is formed by a 2-D braid ("Litze") preforming process followed by resin transfer molding.

17. A vehicle seat comprising:
a back panel including a first polymeric matrix and a first plurality of bio fibers disposed therein; and
a load carrier component attached to the back panel, the load carrier component including a second polymer matrix and a second plurality of bio fibers disposed therein, wherein the load carrier component is integral with the back panel, the load carrier component including a pair of curved or sigmoid shaped bio fiber shell embedded in the second polymer matrix with continuous bio fibers in each bio fiber shell being substantially parallel to each other and optionally angled with respect to a longitudinal tube axis, the load carrier component including ribs disposed over a surface thereof.

18. The vehicle seat of claim 17 wherein the ribs are made of PE/PA with or without fiber.

19. The vehicle seat of claim 18 wherein the load carrier component is formed by a tape-laying preform process followed by compression molding and injection over-molding.

* * * * *